United States Patent
Park

(10) Patent No.: US 8,174,629 B2
(45) Date of Patent: May 8, 2012

(54) DISPLAY SYSTEM EQUIPPED WITH UNTWISTING FUNCTION AND RETURN FUNCTION FOR UNFOLDING STATE

(75) Inventor: Kyung Soo Park, Ansan-si (KR)

(73) Assignee: JSLCD Co., Ltd. (KR)

( * ) Notice: Subject to any disclaimer, the term of this patent is extended or adjusted under 35 U.S.C. 154(b) by 164 days.

(21) Appl. No.: 12/742,817

(22) PCT Filed: Nov. 21, 2008

(86) PCT No.: PCT/KR2008/006888
§ 371 (c)(1),
(2), (4) Date: May 13, 2010

(87) PCT Pub. No.: WO2009/069919
PCT Pub. Date: Jun. 4, 2009

(65) Prior Publication Data
US 2010/0282798 A1    Nov. 11, 2010

(30) Foreign Application Priority Data

Nov. 29, 2007 (KR) .................. 10-2007-0122485
Nov. 29, 2007 (KR) .................. 10-2007-0122486

(51) Int. Cl.
*B60R 11/02* (2006.01)
(52) U.S. Cl. .................. 348/837; 248/317; 248/917
(58) Field of Classification Search .......... 224/309;
348/837, 148, 333.06, 373, 794; 349/58;
361/679.01, 679.02; 248/317, 917; 74/405,
74/411, 416, 417, 412 R, 420, 421 A, 423,
74/425
See application file for complete search history.

(56) References Cited

U.S. PATENT DOCUMENTS

| | | | | |
|---|---|---|---|---|
| 4,796,479 A | * | 1/1989 | Wisecarver | 74/398 |
| 5,096,271 A | * | 3/1992 | Portman | 312/7.2 |
| 6,529,123 B1 | * | 3/2003 | Paul, Jr. | 340/425.5 |
| 6,647,819 B1 | * | 11/2003 | Chang | 74/421 A |
| 7,788,770 B2 | * | 9/2010 | Vitito et al. | 16/341 |
| 7,871,115 B2 | * | 1/2011 | Vitito et al. | 296/37.8 |
| 7,914,055 B2 | * | 3/2011 | Yoshinaka | 292/306 |

(Continued)

FOREIGN PATENT DOCUMENTS

JP    2004-237895    8/2004

(Continued)

OTHER PUBLICATIONS

International Search Report—PCT/KR2008/006888 dated May 21, 2009.

*Primary Examiner* — Eduardo Colon
(74) *Attorney, Agent, or Firm* — Cantor Colburn LLP

(57) ABSTRACT

A vehicle display system having both an untwisting function and a position restoring function is provided. The vehicle display system includes a main body, a display panel, one or more drive means, a microcontroller, one or more clutch means, and windup springs. The main body is mounted on the ceiling of a vehicle. The display panel is coupled to the main body so as to be rotated. The drive means rotate two connection members connected to respective ends of the display panel. The microcontroller operates the drive means so that the display panel is unfolded when receiving basic signals. Each of the clutch means causes a corresponding connection member to run idle over a corresponding rotational shaft. Each of the windup springs is mounted to the corresponding rotational shaft and is wound when the display panel is unfolded.

6 Claims, 6 Drawing Sheets

[30 : 31(31a), 32, 33, 34, 35(35a), 36(36a)]
[CM : 37, 38, 39]

U.S. PATENT DOCUMENTS 7,950,610 B2 * 5/2011 Sawai .......................... 248/131
8,059,215 B2 * 11/2011 Ikunami ........................ 348/837

FOREIGN PATENT DOCUMENTS

| | | |
|---|---|---|
| JP | 2005-014847 | 1/2005 |
| JP | 2006-088797 | 4/2006 |
| KR | 20-0267853 | 3/2002 |
| KR | 10-2002-0059967 | 7/2002 |
| KR | 10-2002-0095965 | 12/2002 |
| KR | 10-2006-0092722 | 8/2006 |
| KR | 10-0757579 | 9/2007 |

* cited by examiner

[Fig. 1]
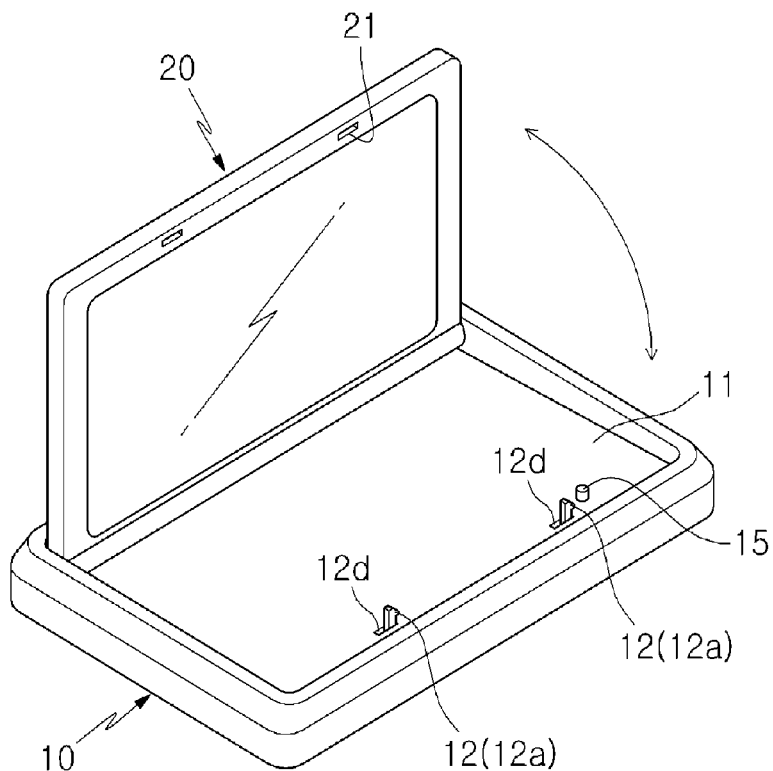
[Fig. 2]
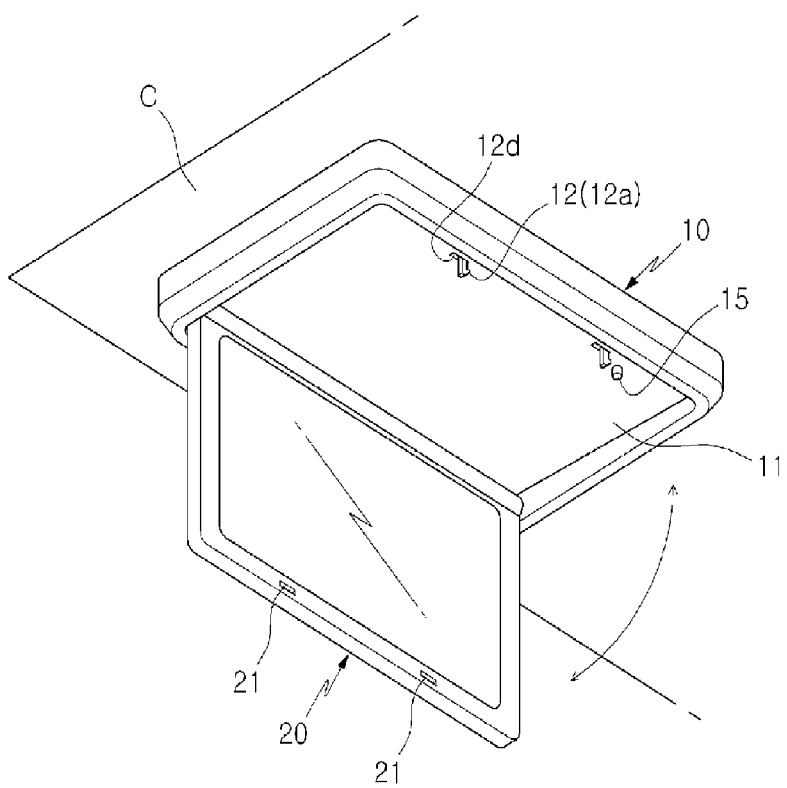

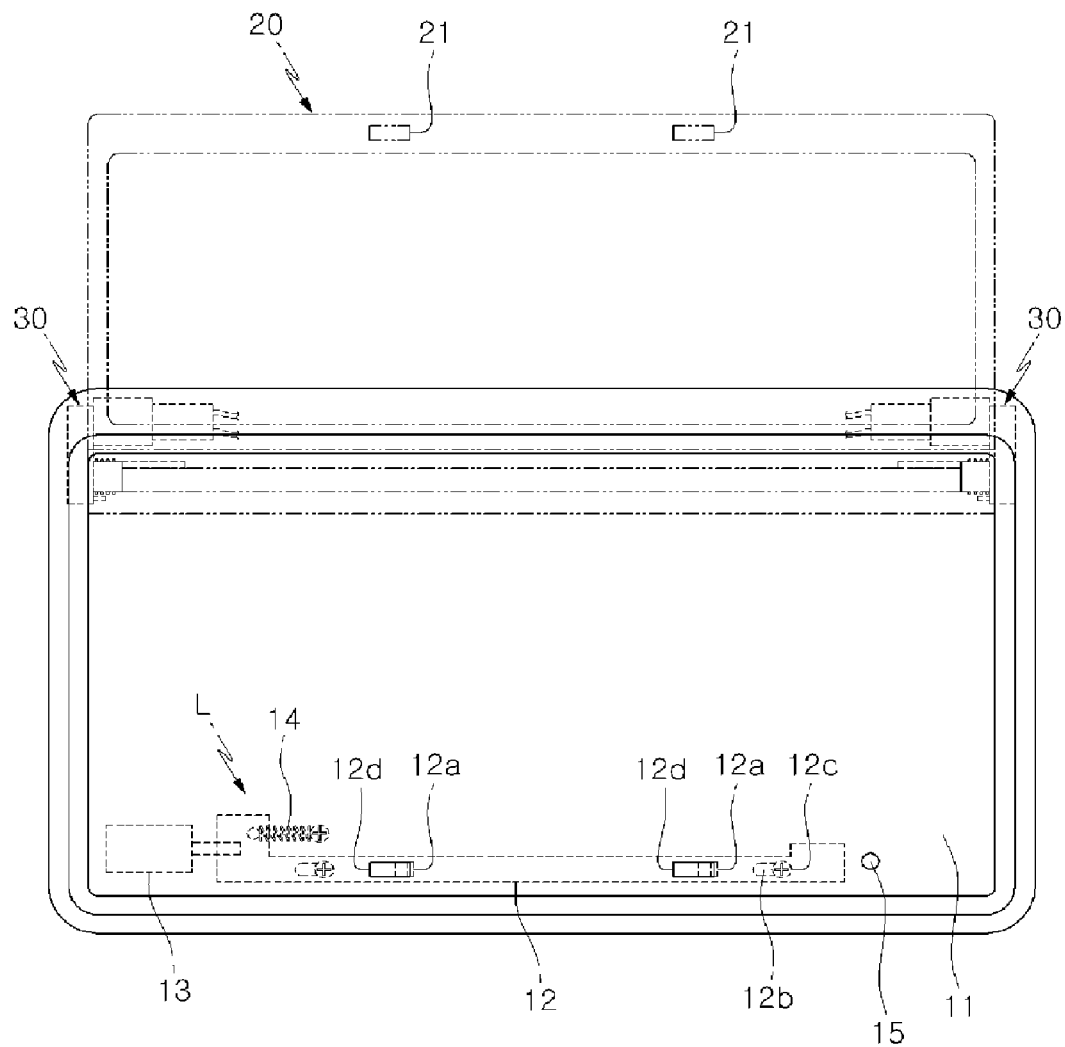
[Fig. 3]
[L : 12(12a, 12b, 12c, 12d), 13]

[Fig. 4]
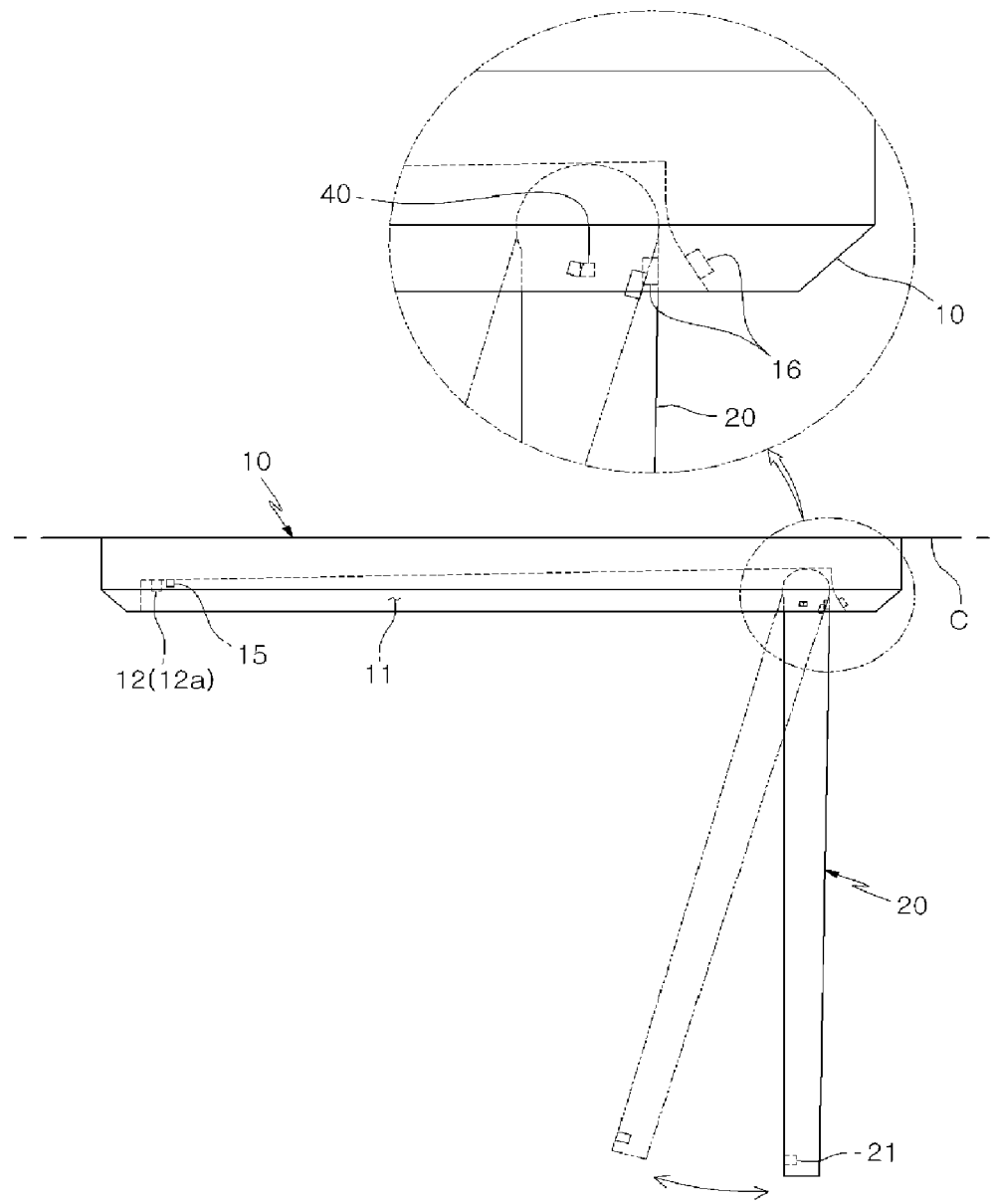

[Fig. 5]
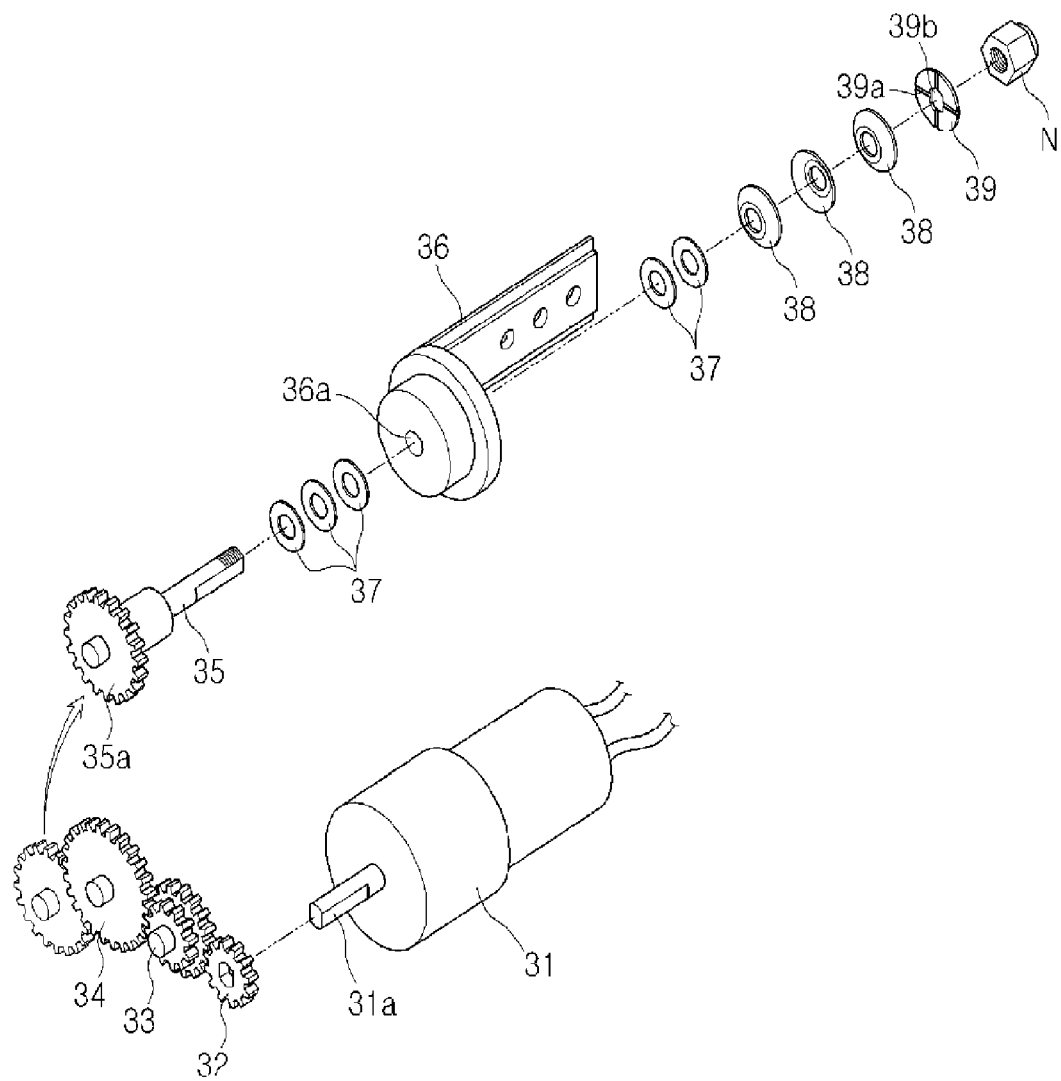
[30 : 31(31a), 32, 33, 34, 35(35a), 36(36a)]
[CM : 37, 38, 39]

[Fig. 6]
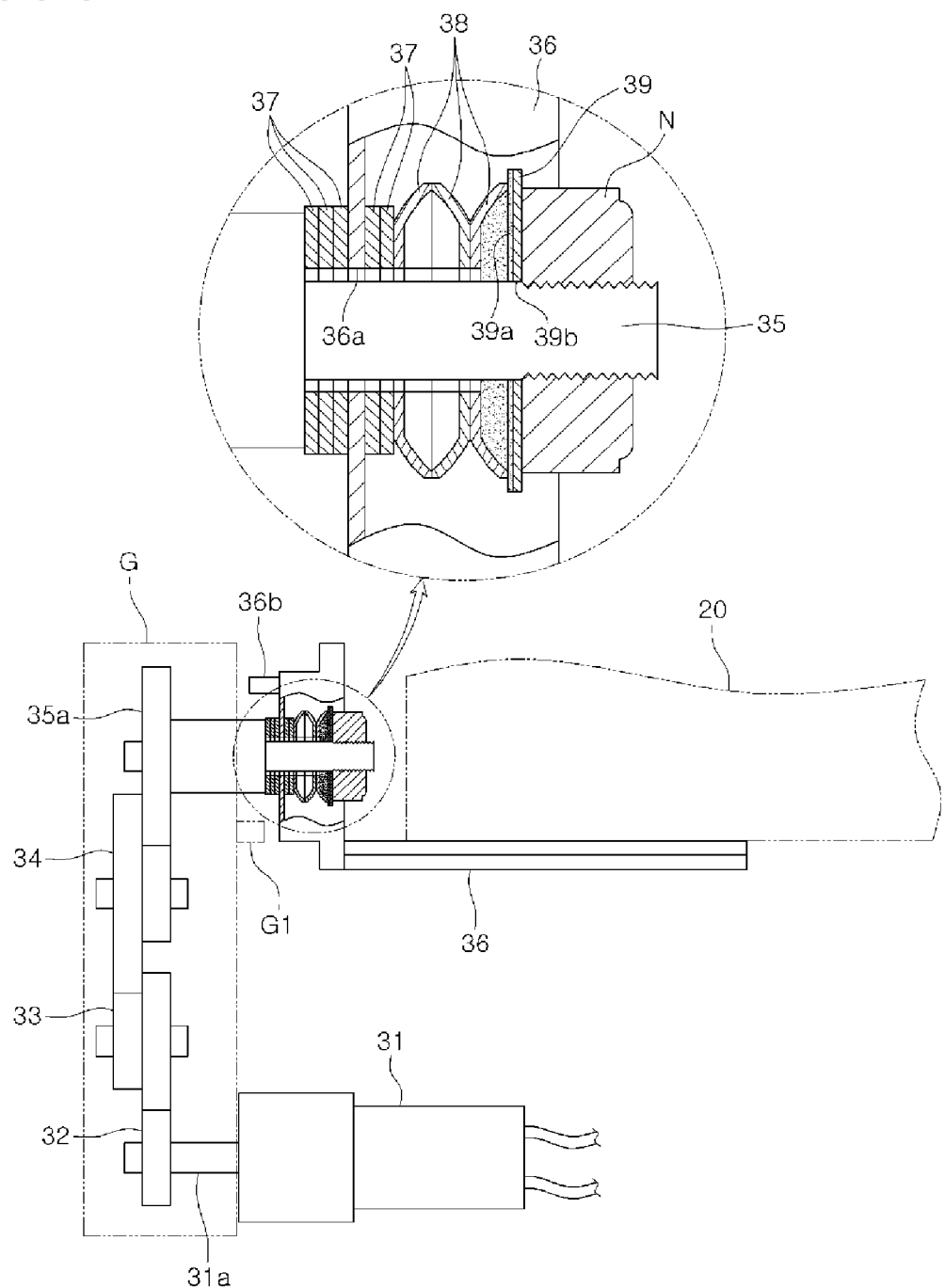

[Fig. 7]
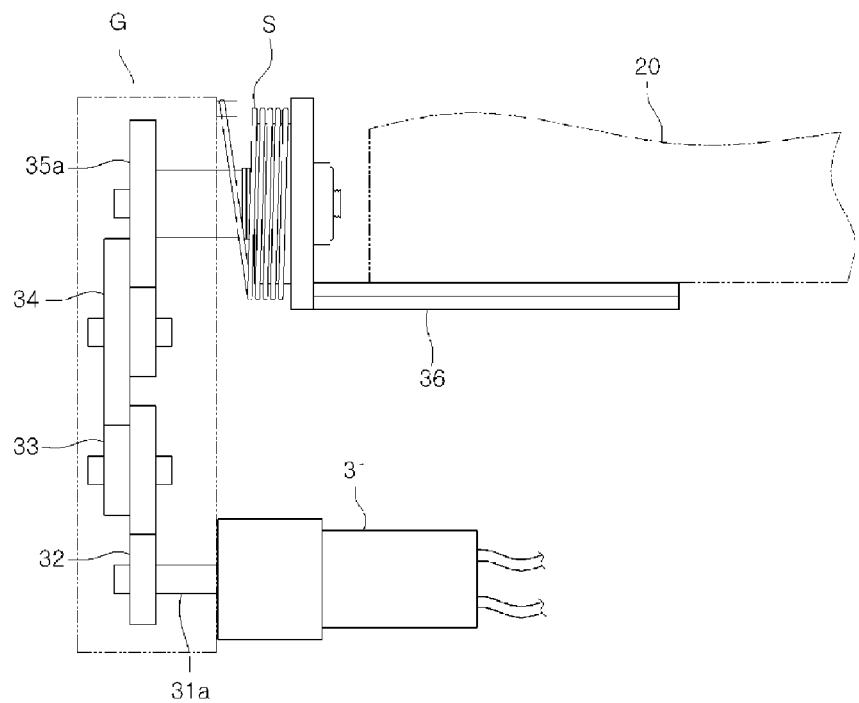
[Fig. 8]
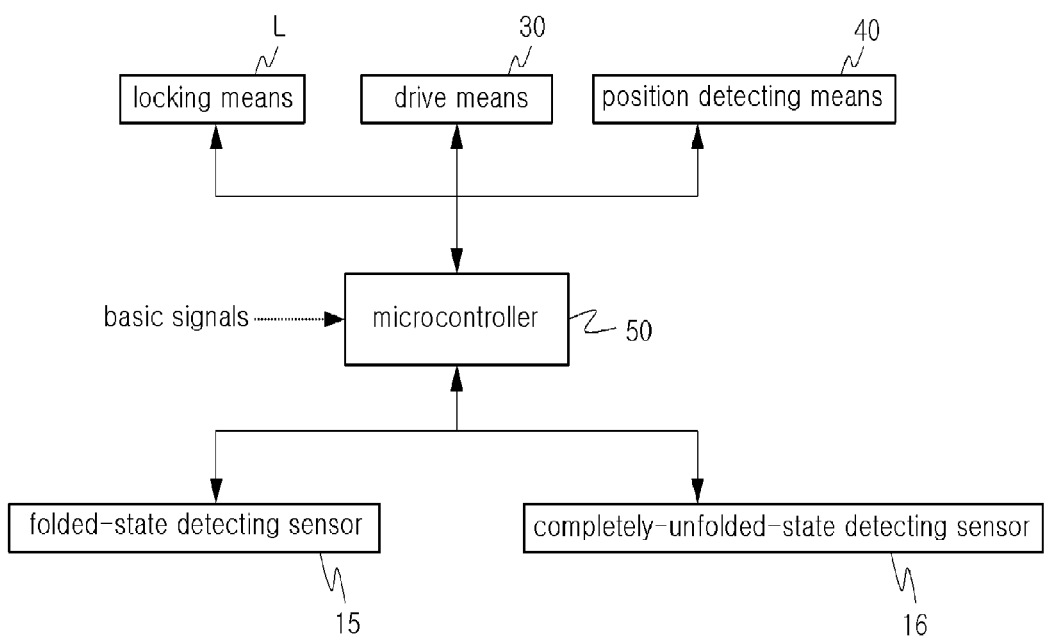

DISPLAY SYSTEM EQUIPPED WITH UNTWISTING FUNCTION AND RETURN FUNCTION FOR UNFOLDING STATE

TECHNICAL FIELD

The present invention relates to a vehicle display system having both an untwisting function and a position restoring function, which includes one or more clutch means for causing connection members which are connected to a display panel to run idle over the rotational shafts of drive means when a force that is greater than that necessary for folding and unfolding the display panel is applied, and which includes a position detecting means for detecting whether the display panel has been displaced from a preset unfolding position, thus restoring the displaced display panel to the preset unfolding position by causing a microcontroller to operate the drive means in response to a received detection signal, and which can automatically lock or unlock the main body to or from the display panel in the display folding mode or in the display unfolding mode, and which can automatically fold the display panel in response to various basic signals, and which can prevent the display panel from being lowered rapidly due to its own weight when the display panel is unfolded and can facilitate the upward rotation of the display panel in conjunction with the operation of the drive means when the display panel is folded, and which can prevent noise from being generated by applying to the drive means a voltage that is lower than the voltage rating of the drive means.

BACKGROUND ART

Generally, a vehicle display system is mounted on the ceiling of a vehicle in order to provide various kinds of media information to passengers. Such a vehicle display system includes a locking means which is mounted in a main body to lock or unlock a display panel. As an example of such a locking means, a cover panel locking device which enables the cover panel of a notebook computer to be slightly unfolded when the cover panel is unlocked is disclosed in Korean Unexamined Pat. No. 10-2002-0059967, entitled "Cover panel locking device for notebook computers." However, the disclosed device is based on the method of unlocking the cover panel in only a one-touch manner. Accordingly, in the case where the device is applied to a vehicle display system having a large size, a traffic accident may result from being unfolded directly by a driver.

Meanwhile, rather than being in the unfolded state, the vehicle display system is normally in the folded state. That is, the display panel, which is normally held in the main body of the vehicle display system, is unfolded from the main body only when the vehicle display system is put into operation.

As an example of a technology for unfolding a display panel from a main body, a mounting device for securely mounting a large-sized Liquid Crystal Display (LCD) monitor to a vehicle, such as a coach, and holding it is disclosed in Korean Pat. No. 10-0423301, entitled "Device for mounting a vehicle LCD monitor." However, the disclosed device is problematic in that the unfolding angle of the monitor which is mounted to a large-sized vehicle such as a coach, may be changed due to contact being made therewith when passengers get in or out of the vehicle.

Furthermore, in order to drive the large-sized LCD monitor, two drive means are mounted to the respective ends of the rotation portion of the device. In this case, a twisting of the display monitor is caused due to a minute difference between the number of rotations of drive motors, which constitute the two drive means.

DISCLOSURE OF INVENTION

Technical Problem

Accordingly, an object of the present invention is to provide a vehicle display system, which includes one or more clutch means, each comprising spring washers, which is configured to press a corresponding connection member in one direction so as to prevent the corresponding connection member from running idle due to the diameter of the coupling hole of the corresponding connection member, which is greater than the external diameter of a corresponding rotational shaft, and a lubrication washer, which is configured to have high-viscosity lubricant holding grooves to adjust the frictional resistance of the corresponding connection member, thus preventing a display panel from twisting.

Another object of the present invention is to provide a vehicle display system, which can detect whether the display panel has been displaced from a preset unfolding position using a position detecting means, and which can cause the display panel to be restored to its original position under the control of the microcontroller that operates the drive means in response to a detection signal received from the position detecting means.

A further object of the present invention is to provide a vehicle display system, which includes a locking means to automatically lock or unlock the display panel.

Yet another object of the present invention is to provide a vehicle display system which enables electric motors, constituting the drive means, to receive a voltage that is lower than the voltage rating of each motor, thus preventing noise from being generated by the drive means.

Technical Solution

In order to accomplish the above objects, the present invention provides a vehicle display system having both an untwisting function and a position restoring function, including: a main body mounted on the ceiling of a vehicle; a display panel coupled to the main body so as to be rotated; one or more drive means for rotating two connection members connected to respective ends of the display panel; a microcontroller for controlling the drive means, and operating the drive means so that the display panel is unfolded when receiving basic signals, which are generated by the supply of power, a playback operation, and the insertion of a recording medium; one or more clutch means, each comprising: spring washers, each of which is configured to press a corresponding connection member in one direction so as to prevent the corresponding connection member from running idle due to the diameter of a coupling hole of the corresponding connection member, which is greater than the external diameter of a corresponding rotational shaft provided in a corresponding drive means; and a lubrication washer, which is configured to have high-viscosity lubricant holding grooves to adjust the frictional resistance of the corresponding connection member and which is fastened to the corresponding rotational shaft so as not to be rotated; wherein each of the clutch means is interposed between the corresponding connection member and the rotational shaft of the corresponding drive means, and causes the corresponding connection member to run idle over the corresponding rotational shaft when a force that is greater than that necessary for unfolding or folding the display panel is applied; and windup springs, each of which is mounted to the corresponding rotational shaft that connects the main body with the display panel and is wound when the display panel is unfolded.

Furthermore, the vehicle display system may further includes a position detecting means for detecting whether the display panel has been displaced from a preset unfolding position. In the vehicle display system, the microcontroller may cause the display panel to be restored to its original position by operating the drive means in response to a detection signal received from the position detecting means.

Furthermore, the vehicle display system may further includes a locking means including a locker, which is configured to lock the display panel, and an actuating member, which is configured to actuate the locker so as to pull back and unlock the locker in response to a signal received from the microcontroller in the unfolding mode, to pull back the locker in response to a signal received from the microcontroller when the display panel is rotated to a predetermined angle in the folding mode, and to lock the locker when the display panel has been completely unfolded.

Meanwhile, each of the drive means is constructed using an electric motor. The electric motor receives a voltage that is lower than the voltage rating thereof.

Advantageous Effects

The vehicle display system having both an untwisting function and a position restoring function according to the present invention has the following effects.

First, the present invention includes one or more clutch means, thus solving the problem of a minute twisting of the display panel, which is caused by two drive means when the display panel is unfolded from or folded to the main body. In addition, the present invention enables the manual folding and unfolding of the display panel.

Second, the microcontroller automatically controls the drive means in response to received basic signals, so that the display panel can be automatically folded and unfolded.

Third, the windup springs are mounted to the respective rotational shafts that connect the main body with the display panel, so that the display panel can be prevented from being lowered rapidly due to its own weight or the shaking of a vehicle when the display panel is unfolded, and the folding operation of the display panel in conjunction with the operation of the drive means can also be facilitated when the display panel is being folded.

Fourth, the present invention detects whether the display panel has been displaced from the preset unfolding position using the position detecting means, and causes the display panel to be restored to its original position under the control of the micro-controller which operates the drive means in response to a detection signal received from the position detecting means, so that it is not necessary for a driver to manually manipulate the display panel during driving, and thus a safety accident can be prevented from occurring.

Fifth, a voltage that is lower than the voltage rating of each motor, that is, a half voltage, is applied to the electric motors, which constitute the drive means, so that noise can be prevented from being generated.

BRIEF DESCRIPTION OF THE DRAWINGS

FIG. 1 is a perspective view showing a vehicle display system according to the present invention;

FIG. 2 is a perspective view showing the state in which the vehicle display system according to the present invention is mounted on the ceiling of a vehicle;

FIG. 3 is a plan view of the vehicle display system according to the present invention;

FIG. 4 is a side view of the vehicle display system according to the present invention;

FIG. 5 is a disassembled perspective view showing the drive and clutch means of the vehicle display system according to the present invention;

FIG. 6 is an assembled plan view showing the drive and clutch means of the vehicle display system according to the present invention;

FIG. 7 is an assembled plan view showing the windup spring of the vehicle display system according to the present invention; and FIG. 8 is a block diagram of the vehicle display system according to the present invention.

DESCRIPTION OF CHARACTERS OF PRINCIPAL ELEMENTS

10: main body 11: mounting space
15: folded-state detecting sensor
16: completely-unfolded-state detecting sensor
20: display panel 21: locking recess
30: drive means 31: electric motor
32: driver gear 33 and 34: reduction gear
35: rotational shaft 36: connection member
40: position detecting means
50: microcontroller CM: clutch means
37: space washer 38: spring washer
39: lubrication washer L: locking means
12: locker 13: actuating member
14: elastic spring S: windup spring

BEST MODE FOR CARRYING OUT THE INVENTION

The present invention is described in detail with reference to the accompanying drawings below.

FIG. 1 is a perspective view showing a vehicle display system according to the present invention, FIG. 2 is a perspective view showing the state in which the vehicle display system according to the present invention is mounted on the ceiling of a vehicle, FIG. 3 is a plan view of the vehicle display system according to the present invention, FIG. 4 is a side view of the vehicle display system according to the present invention, FIG. 5 is a disassembled perspective view showing the drive and clutch means of the vehicle display system according to the present invention, FIG. 6 is an assembled plan view showing the drive and clutch means of the vehicle display system according to the present invention, FIG. 7 is an assembled plan view showing the windup spring of the vehicle display system according to the present invention, and FIG. 8 is a block diagram of the vehicle display system according to the present invention.

As shown in FIGS. 1 to 8, the vehicle display system having both an untwisting function and a position restoring function according to the present invention includes a main body 10, a display panel 20, one or more drive means 30, a position detecting means 40, one or more clutch means CM, and a microcontroller 50. The components, the coupling relationships therebetween, and the operation thereof are described below.

The main body 10 is mounted on the ceiling C of a vehicle as shown in FIG. 2. In the present invention, a description of the main body 10, which is overturned as shown in FIG. 1, will be made below.

A mounting space 11 is formed in the upper portion of the main body 10 to hold the display panel 20. The one or more drive means 30, the position detecting means 40 and the microcontroller 50 are mounted in the main body 10.

Furthermore, in the mounting space 11, two recesses 12d are formed in the upper surface of the main body 10 at respective locations opposite the locking recesses 21 of the display panel 20, which will be described later.

The locking parts 12a protrude through the recesses 12d and are provided in a locker 12. A locking means L is provided in the main body 10. The locking means includes an actuating member 13 which is connected to one end of the locker 12.

The actuating member 13 is driven by the microcontroller 50, thus bi-directionally moving the locker 12.

In this case, in the present invention, the actuating member 13 is constructed using a solenoid valve.

Accordingly, the locking parts 12a of the locker 12 can be locked to or unlocked from the locking recesses 21 of the display panel 20.

In the unfolding mode, the microcontroller 50 applies a signal to the actuating member 13 so that the locker 12 can be pulled back and unlocked. In the folding mode, when the display panel 20 is rotated to a predetermined angle, the microcontroller 50 applying a signal to the actuating member 13 so that the locker 12 can be pulled back. Subsequently, when the display panel 20 has been completely unfolded, the locker 12 is locked.

Furthermore, guide recesses 12b are formed in the locker 12a so as to guide the motion of the locker 12. Fastening screws 12c are provided so as to be inserted into the respective guide recesses 12b and be fastened to the main body 10.

Meanwhile, an elastic spring 14 is provided so as to generate an elastic force in the direction in which the display panel 20 is locked by the locker 12, that is, in the direction in which the locking parts 12a of the locker 12 are locked to the locking recesses 21 of the display panel 20. To this end, the elastic spring 14 is configured such that one end thereof is fastened to the main body 10 and such that the other end thereof is fastened to the other end of the locker 12.

Furthermore, a folded-state detecting sensor 15 is provided in the mounting space 11 so as to detect one end of the display panel 20 when the display panel 20 is folded. In the present invention, the folded-state detecting sensor 15 is constructed using a limit switch. Furthermore, a completely-unfolded-state detecting sensor 16 is provided in the main body 10 so as to detect whether the display panel 20 has been completely unfolded from the main body 10, that is, whether the display panel 20 has been rotated to a rotational limit angle, which is set at the onset of manufacturing.

Furthermore, in the present invention, the completely-unfolded-state detecting sensor 16 is constructed using a magnetic sensor. Furthermore, a magnet is inserted into the outer surface of the rotation portion of the display panel 20. Accordingly, the completely-unfolded-state detecting sensor 16 which is mounted in the main body 10 can detect whether the display panel 20 has been completely unfolded (whether the display panel 20 has been rotated to the rotational limit angle).

The display panel 20 is coupled to the main body 10 so as to be rotated. The display panel 20 is rotated into the mounting space 11 of the main body 10 and is held therein. The locking recesses 21, into which the locking parts 12a of the locker 12 are inserted and are thus locked or unlocked, are provided at the respective locations opposite the recesses 12d of the main body 10.

The drive means 30 function to unfold and fold the display panel 20. To this end, each of the drive means 30 includes an electric motor 31 having a drive shaft 31a, a driver gear 32 which is rotatably mounted to the drive shaft 31a of the electric motor 31, reduction gears 33 and 34 which are engaged with the driver gear 32, a rotational shaft 35 having a driven gear 35a engaged with the reduction gear 34, and a connection member 36 which is configured to have a coupling hole 36a, the diameter of which is greater than the external diameter of the rotational shaft 35, so as to run idle over the rotational shaft 35.

The connection members 36 are connected to the display panel 20. A voltage that is lower than the voltage rating of each motor (that is, a voltage that is half of the rated voltage) is applied to the electric motors 31 which constitute the drive means 30, and thus an effect of remarkably reducing the noise that is generated by the electric motor 31, as compared to that generated when the rated voltage is applied, can be achieved.

The clutch means CM function to cause the connection members 36 to run idle over the respective rotational shafts 35 when a force that is greater than that necessary for unfolding or folding the display panel 20 is applied. Each of the clutch means CM includes a plurality of space washers 37, a plurality of spring washers 38, and a lubrication washer 39.

The rotational shafts 35 are inserted into respective coupling holes 36a of the connection member 36. The space washers 37 are fitted around a corresponding rotational shaft 35 and are located inside and outside a corresponding connection member 36 so as to ensure space.

The spring washers 38 are inserted into the corresponding rotational shaft 35 and are arranged so as to be in close contact with the last space washer 37. In this case, each of the spring washers 38 has a concave shape on one side thereof so as to have an elastic force. These concave spring washers 38 are alternately inserted into the corresponding rotational shaft 35 and arranged.

Here, the term 'alternately' means that the concave portions of the spring washers 38 are alternately arranged with each other when the spring washers 38 are arranged.

In the present invention, three spring washers 38 are alternately arranged. In this case, the three spring washers 38 are arranged such that the concave portion of the last spring washer 38 is oriented towards the outside.

Accordingly, a space is formed between the concave portion of the last spring washer 38 and the lubrication washer 39, which will be described below.

Meanwhile, the lubrication washer 39 is fitted around the rotational shaft 35 to be in close contact with the last spring washer 38. The lubrication washer 39 has holding grooves 39a, in which high-viscosity lubricant is charged.

Accordingly, the frictional resistance between the holding grooves 39a of the lubrication washer 39 and the last spring washer 38, that is, the frictional resistance between the holding grooves 39a of the lubrication washer 39 and the spring washer 38 that is in contact with the lubrication washer 39, can be adjusted by the high-viscosity lubricant. The technical description of the adjustment of the frictional resistance will be described in detail below.

The space washers 37 and the spring washers 38 are formed to have internal diameters greater than the external diameter of the rotational shaft 35, so that they can run idle over the rotational shaft 35.

Furthermore, the lubrication washer 39 has a fastening hole 39b having a shape that corresponds to that of the section of the rotational shaft 35, so that it can be fastened to the rotational shaft 35.

A fastening nut N, which is the last component of each of the clutch means CM, is threadedly coupled to the end of the rotational shaft 35 so as to prevent the lubrication washer 39 from being removed. In order to enable the threaded coupling of the fastening nut N, a thread is formed on the end of the rotational shaft 35.

Meanwhile, referring to FIG. 7, windup springs S are mounted to the respective rotational shafts 35 that connect the main body 10 with the display panel 20. The windup springs S are wound when the display panel 20 is unfolded.

The windup springs S facilitate the rotation of the display panel 20 that is unfolded or folded by the drive means 30. Furthermore, the windup springs S function to prevent the backlash of the gears from occurring.

In greater detail, the windup springs S prevent the display panel 20 from being lowered rapidly due to its own weight in the unfolding mode, and facilitate the folding of the display panel 20 in conjunction with the operation of the drive means 30 in the folding mode.

Meanwhile, referring to FIG. 6, anti-rotation protrusions G1 and 36b are provided on a gear body G, which surrounds the gears 32, 33, 34 and 35a, and on the connection member 36, respectively. The angle between the position from which the connection member 36 starts to be rotated with respect to the rotational shaft 35 and the position at which the anti-rotation protrusions G1 and 36b come into contact with each other corresponds to the rotation angle of the display panel 20 from the main body 10, and thus the rotation angle of the display panel 20 can be adjusted.

Referring to FIG. 4, in addition to the anti-rotation protrusions G1 and 36b, the completely-unfolded-state detecting sensor 16 is used as a means for adjusting the angle at which the display panel 20 is completely unfolded from the main body 10. When the rotating display panel 20 reaches a rotation step protrusion (not shown) in which the completely-unfolded-state detecting sensor 16 is located, the folding of the display panel 20 is interrupted.

Referring to FIG. 4, the position detecting means 40 functions to detect whether the display panel 20 has been displaced from a preset unfolding position. When the display panel 20 reaches the preset unfolding position by rotating from the main body 10 according to a preset unfolding angle, the position detecting means 40 detects that the display panel 20 has reached the preset unfolding position and transmits a detection signal to the microcontroller 50.

For example, in the case where the unfolding angle is set to 90°, a sensor is mounted in the main body 10 at the location of the display panel 20, which is unfolded 90° from the main body 10, so that a detection signal generated by the mounted sensor can be transmitted to the microcontroller 50.

Accordingly, if the display panel 20 is displaced from the preset unfolding position, that is, if the display panel 20 moves due to a sudden starting or stopping of a vehicle or an external impact (caused by a passenger or driver), the position detecting means 40 transmits a detection signal to the microcontroller 50, and thus the microcontroller 50 causes the display panel 20 to be restored to the preset unfolding position by operating the drive means 30.

In greater detail, when the display panel 20 is rotated to the preset unfolding angle in response to the operation of the drive means 30 and when the rotating display panel 20 reaches the preset unfolding position, the microcontroller 50 receives a detection signal from the position detecting means 40 and interrupts the operation of the drive means 30.

When the microcontroller 50 receives basic signals which are generated by the supply of power, a playback operation, and the insertion of a recording medium, the microcontroller 50 causes the display panel 20 to be unfolded by operating the drive means 30. Furthermore, when the signaling of a basic signal is interrupted, the micro-controller 50 causes the unfolded display panel 20 to be folded by operating the drive means 30.

The operation of the vehicle display system having both an untwisting function and a position restoring function according to the present invention is described below.

When a basic signal, which is generated by the supply of power, a playback operation, or the insertion of a recording medium, is received from the main body 10, which is mounted on the ceiling C of a vehicle, the microcontroller 50 causes the display panel 20 to be unfolded by operating the drive means 30.

That is, when a basic signal is applied to the microcontroller 50, the actuating member 13 of the locking means L is driven by the microcontroller 50, and thus the locking parts 12a of the locker 12 is released from the locking recesses 21 of the display panel 20. In this case, the electric motors 31 of the drive means 30 are driven by the microcontroller 50, so that the driver gear 32, the reduction gears 33 and 34, and the driven gear 35a, which are mounted to each drive shaft 31a, are rotated, and thus the rotational shaft 35 integrated with the driven gear 35a is also rotated.

Subsequently, in the spring washers 38 and the lubrication washer 39, which are arranged along each rotational shaft 35, and in the corresponding fastening nut N, the spring washers 38 generate elasticity by the appropriate tightening force of the corresponding fastening nut N, and thus the coupling portions between the space washers 37 and the connection member 36 become pressed. Accordingly, the connection member 36 is rotated in conjunction with the rotation of the rotational shaft 35, and thus the display panel 20 connected to the connection member 36 is unfolded.

Meanwhile, the display panel 20 is rotated to the preset unfolding angle.

For example, in the case where the preset unfolding angle is 90°, a setting is performed (the microcontroller 50 operates the electric motors 31 until the display panel 20 is rotated to the preset unfolding angle of 90°) in consideration of the number of rotations/second of the electric motors 31 of the drive means 30. In this manner, the electric motors 31 are driven according to the preset number of rotations/second, and thus the display panel 20 can be rotated to the preset unfolding angle.

Furthermore, for example, in the case where the display panel 20 has been completely unfolded in conjunction with the electric motors 31 of the drive means 30 and the connection members 36 under the control of the microcontroller 30, the completely unfolded display panel 20 is detected by the completely-unfolded-state detecting sensor 16 of the main body 10. Subsequently, the microcontroller 50 that has received a detection signal interrupts the operation of the electric motors 31 of the drive means 30 (refer to FIG. 4).

For example, when the anti-rotation protrusion 36b of each connection member 36 is rotated from an initial position (that is, from a folding position) due to the unfolding of the display panel 20 and then reaches the anti-rotation protrusion G1 of each gear body G, the lubrication washer 39 and the spring washers 38, which are fastened to each rotational shaft 35, run idle, and thus the rotation of the connection members 36 is prevented. That is, a clutch function is performed (refer to FIG. 6).

The windup spring S, which is connected between each connection member 36 and each gear body G, prevents the display panel 20 from being lowered rapidly due to its own weight when the display panel 20 is unfolded, and facilitates the upward rotation of the display panel 20 in conjunction with the operation of the electric motors 31 when the display panel 20 is folded (refer to FIG. 7).

When the display panel 20 unfolded by the preset angle (90°) is displaced from the preset unfolding position due to an external impact, the microcontroller 50 receives a detection signal from the position detecting means 40, and causes the display panel 20 to be restored to its original position, that is, the preset unfolding position, by operating the electric motors 31 of the drive means 30 (refer to FIG. 4).

When the supply of power to the main body 10 is interrupted, the display panel 20 can be manually unfolded or folded using the clutch means CM according to the present invention.

Meanwhile, when a button (not shown) is pushed or when the signaling of a basic signal is interrupted, the display panel 20 is automatically folded.

In greater detail, the display panel 20 is rotated in conjunction with the operation of the electric motors 31 of the drive means 30 under the control of the microcontroller 50. The rotating display panel 20 is detected by the folded-state detecting sensor 15 of the main body 10. The microcontroller 50, which has received a detection signal, interrupts the operation of the drive means 30 and, at the same time, operates the actuating member 13 of the locking means L so that the locking parts 12*a* of the locker 12 can be locked.

In other words, the actuating member 13 is operated in advance at a position before the display panel 20, which is folded by the drive means 30, reaches the folded-state detecting sensor 15 (which is set in consideration of the number of rotations of each electric motor 31 using a timer), and thus the locking parts 12*a* of the locker 12 are locked.

When the display panel 20 reaches the folded-state detecting sensor 15, the actuating member 13 is simultaneously operated, and thus the locking parts 12*a* of the locker 12 are caught and locked to the locking recesses 21 of the display panel 20.

Furthermore, in the case where the display panel 20 is manually folded in the state in which the supply of power to the main body 10 is interrupted, the locking parts 12*a* of the locker 12, which always generate elasticity in the locking direction due to the elastic spring 14 of the locking means L, are brought into contact with the locking recesses 21 of the display panel 20, are pulled back, and are locked by the elastic spring 14.

Meanwhile, a minute difference between the number of rotations of the electric motors 31 of the drive means 30, which are mounted to the respective ends of the rotation portion of the device, can be removed. That is, even if a twisting of the display panel 20 occurs due to a minute difference between the number of rotations of the two electric motors 31, the connection members 36 run idle with respect to the rotational shafts 35 by the clutch means CM. Accordingly, the twisting problem can be solved.

The invention claimed is:

1. A vehicle display system having both an untwisting function and a position restoring function, comprising:
   a main body mounted on a ceiling of a vehicle;
   a display panel coupled to the main body so as to be rotated;
   one or more drive means for rotating two connection members connected to respective ends of the display panel;
   a microcontroller for controlling the drive means, and operating the drive means so that the display panel is unfolded when receiving basic signals, which are generated by supply of power, a playback operation, and insertion of a recording medium;
   one or more clutch means, each comprising: spring washers, each of which is configured to press a corresponding connection member in one direction so as to prevent the corresponding connection member from running idle due to a diameter of a coupling hole of the corresponding connection member, which is greater than an external diameter of a corresponding rotational shaft provided in a corresponding drive means; and a lubrication washer, which is configured to have high-viscosity lubricant holding grooves to adjust frictional resistance of the corresponding connection member and which is fastened to the corresponding rotational shaft so as not to be rotated; wherein each of the clutch means is interposed between the corresponding connection member and the rotational shaft of the corresponding drive means, and causes the corresponding connection member to run idle over the corresponding rotational shaft when a force that is greater than that necessary for unfolding or folding the display panel is applied; and
   windup springs, each of which is mounted to the corresponding rotational shaft that connects the main body with the display panel and is wound when the display panel is unfolded.

2. The vehicle display system according to claim 1, further comprising:
   position detecting means for detecting whether the display panel has been displaced from a preset unfolding position,
   wherein the microcontroller causes the display panel to be restored to its original position by operating the drive means in response to a detection signal received from the position detecting means.

3. The vehicle display system according to claim 2, wherein each of the drive means is constructed using an electric motor, the electric motor receiving a voltage that is lower than a voltage rating thereof.

4. The vehicle display system according to claim 1, further comprising:
   locking means comprising a locker, which is configured to lock the display panel, and an actuating member, which is configured to actuate the locker so as to pull back and unlock the locker in response to a signal received from the microcontroller in an unfolding mode, to pull back the locker in response to a signal received from the microcontroller when the display panel is rotated to a predetermined angle in a folding mode, and to lock the locker when the display panel has been completely unfolded.

5. The vehicle display system according to claim 4, wherein each of the drive means is constructed using an electric motor, the electric motor receiving a voltage that is lower than a voltage rating thereof.

6. The vehicle display system according to claim 1, wherein each of the drive means is constructed using an electric motor, the electric motor receiving a voltage that is lower than a voltage rating thereof.

* * * * *